March 31, 1970 R. D. LOWRY ET AL 3,503,627

TRAILER HITCH TONGUE AND COUPLER ASSEMBLY

Filed March 26, 1968 2 Sheets-Sheet 1

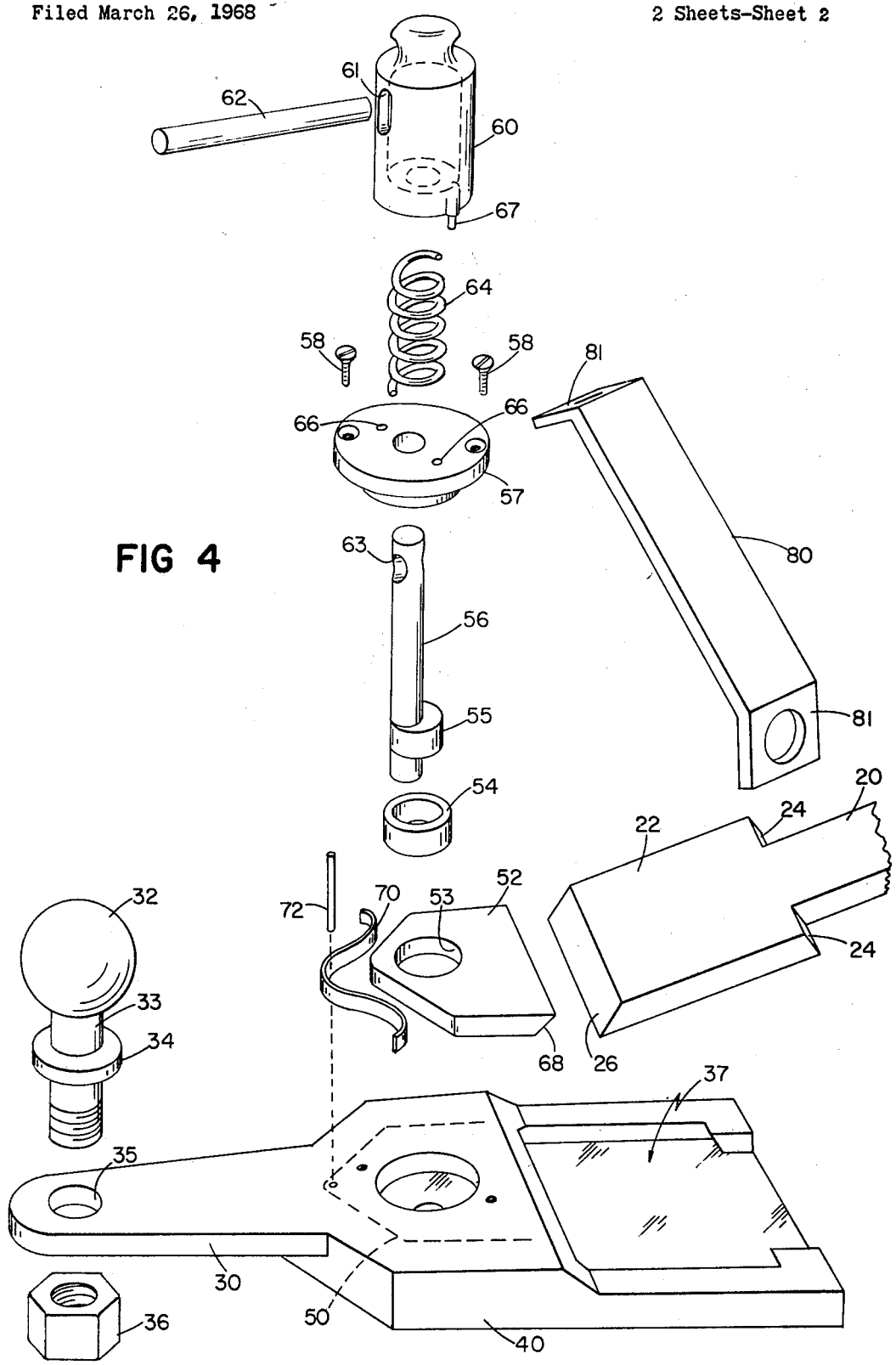

United States Patent Office 3,503,627
Patented Mar. 31, 1970

3,503,627
TRAILER HITCH TONGUE AND COUPLER ASSEMBLY
Robert D. Lowry and Russell B. Strout, Winchester, Mass., assignors to Lowry Development Corporation, Winchester, Mass., a corporation of Massachusetts
Filed Mar. 26, 1968, Ser. No. 716,170
Int. Cl. B60d 1/06, 1/00
U.S. Cl. 280—491                                        4 Claims

ABSTRACT OF THE DISCLOSURE

A trailer hitch has a short coupler for attachment to a tongue permanently mounted on the rear end of a driving vehicle and presenting on its rear portion the conventional ball for attachment of the trailer. The coupler is disengageable. The tongue fits into an oversized socket in the coupler and is locked therein by a camming slide plate.

---

This invention relates to trailer hitches and more particularly to a hitch which does not permanently mount the conventional upstanding ball at the rear of an automobile or tractor, but mounts it rather on the rear end of a separate coupler which may be readily attached to and detached from a simple flat tongue which is permanently mounted on the rear end of the driving vehicle, which tongue need not extend much, if at all, beyond the normal rear end of the vehicle.

Present day trailer hitch accessories which carry a ball and are permanently attached to the driving vehicle have to extend far enough beyond the rear of the vehicle to permit the socket on the trailer bar to pass freely over the ball. Such an extension is dangerous to pedestrians, can be readily damaged in a rear end bump and may often be illegal under state laws when the upstanding ball visually obstructs a rear centrally mounted license plate when the trailer is not hitched.

In accordance with the present invention the ball, instead of being mounted on a permanently attached vehicle part, is mounted on a separate part which acts as a short coupler between a permanently mounted flat tongue on the driving vehicle and the socket of the trailer. The short coupler then may be readily removed and carried in the trunk or elsewhere in the vehicle when not in use, thus only leaving a non-obtrusive, flat tongue at the rear of the car which is well below the license plate and does not visually block it from view.

A trailer hitch using such an unobtrusive tongue in assembly with a coupler of this invention is shown in the accompanying drawings wherein:

FIG. 4 is an exploded view showing the parts of the assembly.

Figure 1:
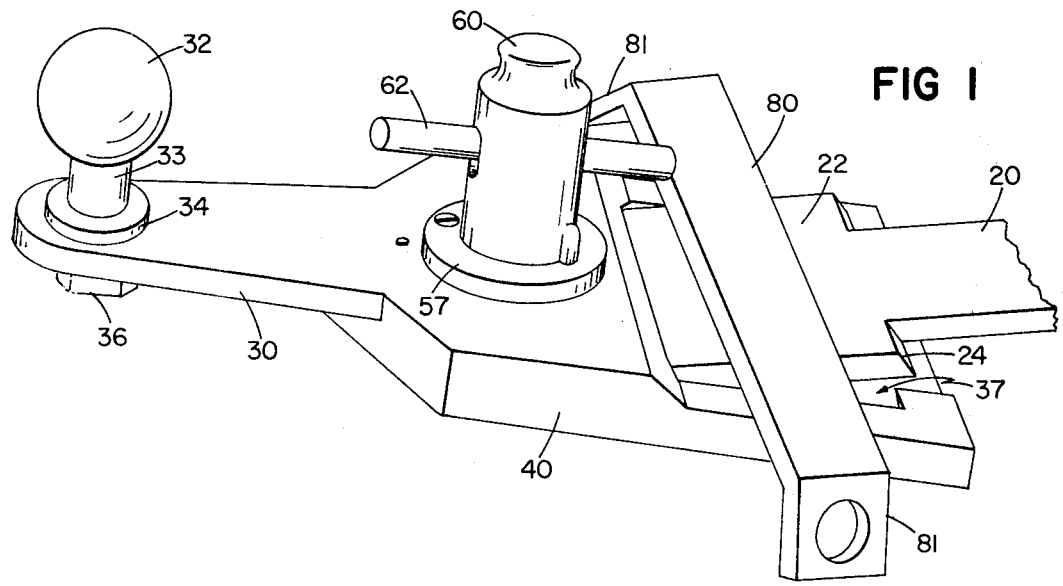
FIG. 1 is a prespective view of the tongue and coupler in a position while they are being assembled together.
Figure 2:
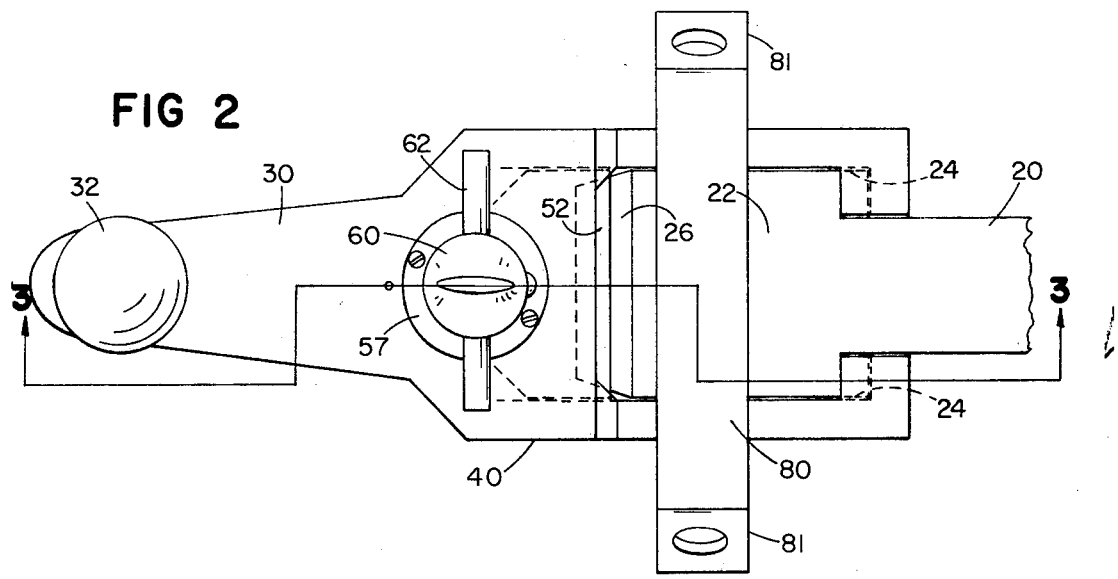
FIG. 2 is a plan view of the assembled device.

The tongue which is permanently attached to the vehicle is shown at 20 and has an enlarged rear portion 22 whose forward and rear edges 24 and 26 respectively are beveled upwardly.

The coupler includes a rear section 30 on which is permanently mounted a conventional trailer hitch ball 32 which as shown in FIG. 4 may be carried on top of a pin 33 having an enlarged collar 34 and a screw threaded bottom end for insertion through a hole 35 in the rear section 30 and engagement by a nut 36.

The forward section 40 of the coupler is of greater thickness than the rear section 30 and is provided at its front end with a wide socket 37 for the rear end 22 of the tongue 20.

Figure 3:
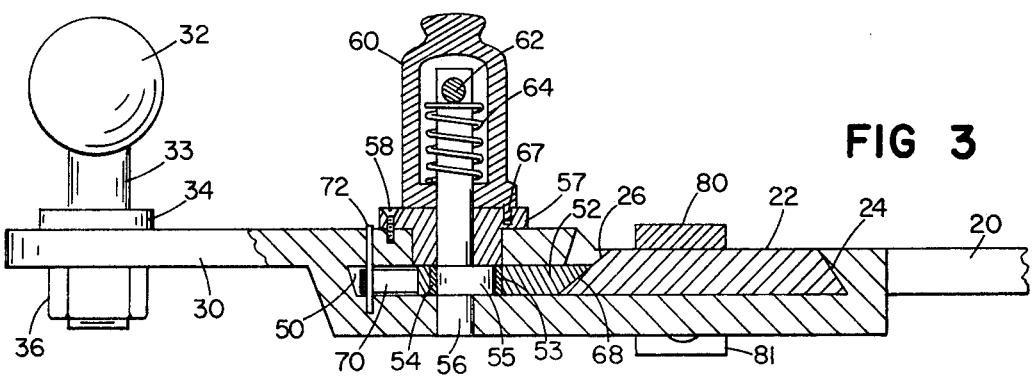
FIG. 3 is a cross sectional view of the device shown in FIG. 2 taken along the line 3–3 in FIG. 2.

For this purpose, the front end of the socket 37 is undercut to receive as shown in FIG. 3 the beveled front edges 24 of the tongue 20.

The socket 37 communicates with a rear covered cavity 50 in which is seated for fore and aft sliding movement a slide plate 52 which is pierced with an aperture 53 in which is received a bushing 54 surrounding a cam lobe 55 on a cam shaft 56 which extends down into a keeper in the bottom wall of the coupler 40.

The cam shaft 56 is held against vertical movement by a flanged plug or cap 57 which is screwed with screws 58 onto the top surface of the coupler.

A lock for holding the cam shaft 56 against inadvertent rotation and in one of two selected alternate positions takes the form of a hollow cap 60 having vertical opposed slots 61 through which a cross pin handle 62 is inserted piercing a hole 63 near the top of the cam shaft 56.

The cap 60 is urged downwardly by a spring 64 seated between the cross-pin 62 and a bottom shoulder of cap 60.

Plug 57 is provided with two diametrically opposed holes 66 adapted to receive a pin 67 fixed on the bottom of the cap 60. When the pin 67 is engaged in one of the holes 66 under the influence of the downward urge of the spring 64 the cap is held against rotation with respect to the coupler and, through the pin 62, will also prevent rotation of the cam shaft 56. In order to rotate the cam shaft 56, the cap 60 may be lifted against the resilience of the spring 64 so that the pin 67 clears the cap of the plug 57 and by rotating the handle 62 the cam shaft 56 may be rotated until the pin can be dropped in the opposite recess 66.

As can be seen such rotation of the cam shaft relative to the coupler will move the slide plate 52 forward and back into and out of locking engagement with the rear beveled end surface 26 of the tongue 22. For this purpose the forward end of the slide plate 52 is beveled downwardly at 68 to provide a vertical interlock against the lifting of the tongue 22 out of the socket cavity.

A flat spring 70, shown best in FIG. 4, is held in the rear end of the cavity 50 by a vertical spring retaining pin 72 and acts as a centering bumper for the slide plate 52 to prevent its misalignment when it is not engaged with the tongue 22.

The tongue 22 may also have affixed to its top surface by welding or bolts, a cross yoke 80 with downwardly bent end portions 81 having apertures for affixing a safety chain.

In operation therefore the coupler member which may have been in the trunk of the car has its cam lock lifted and the cam shaft rotated to move the slide bar 52 to its rearmost position thus permitting the socket to be lifted up beneath the end of the tongue portion 24. The handle 62 is then rotated to cam the slide plate forwardly into the position shown in FIG. 3 to lock the tongue portion 22 in the socket against upward, downward, or any other motion.

The coupler is then ready for attachment of the trailer bar socket over the ball 32.

The coupler may be readily detached from the tongue 20 by reversing the operation rotating the cam shaft in the opposite direction to permit release of the tongue from the socket.

Bushing 54 may be made of nylon or other resilient material to allow cam to move slightly more than that required to tighten, the elastic deformation then keeps the clamp tight for a much longer time after many thousand removals, allowing for wear during use.

What is claimed is:
1. A disengageable trailer hitch assembly comprising a flat tongue having an enlarged rear portion presenting a rear downwardly beveled edge and forward downwardly beveled shoulders, and a coupler including a plate member having on its upper surface a horizontally extending socket symmetrical with but longer than the enlarged portion of said tongue for receiving said enlarged portion when placed in said socket;

a slide plate in said coupler movable towards and away from said socket, and;

rotatable cam means engageable with said slide plate for moving said plate forwardly into engagement with the rear edge of said tongue after it has been placed in said socket;

means for locking said cam in two selected relatively rotated positions; and an upstanding ball on the rear end of said coupler behind said slide plate.

2. An assembly as claimed in claim 1, wherein the forward edge of said slide plate is undercut to ride over the rear beveled edge of said tongue to lock said coupler and tongue against vertical separation.

3. An assembly as claimed in claim 1, wherein the forward side edges of said socket are undercut to ride over the forward beveled shoulders on said tongue when said slide plate is in its forward engagement with the rear edge of said tongue.

4. An assembly as claimed in claim 1 wherein said slide plate has an aperture, and said rotatable cam means is mounted on a cam shaft extending vertically through said aperture, and an annular bushing of resilient plastic material is interposed between said cam means and said plate.

References Cited

UNITED STATES PATENTS

| | | | |
|---|---|---|---|
| 2,622,892 | 12/1952 | Lowman | 280—495 |
| 2,961,256 | 11/1960 | Hinrichsen et al. | 280—491 |
| 2,978,260 | 4/1961 | Hebeisen | 280—491 X |

LEO FRIAGLIA, Primary Examiner

U.S. Cl. X.R.

280—495